UNITED STATES PATENT OFFICE.

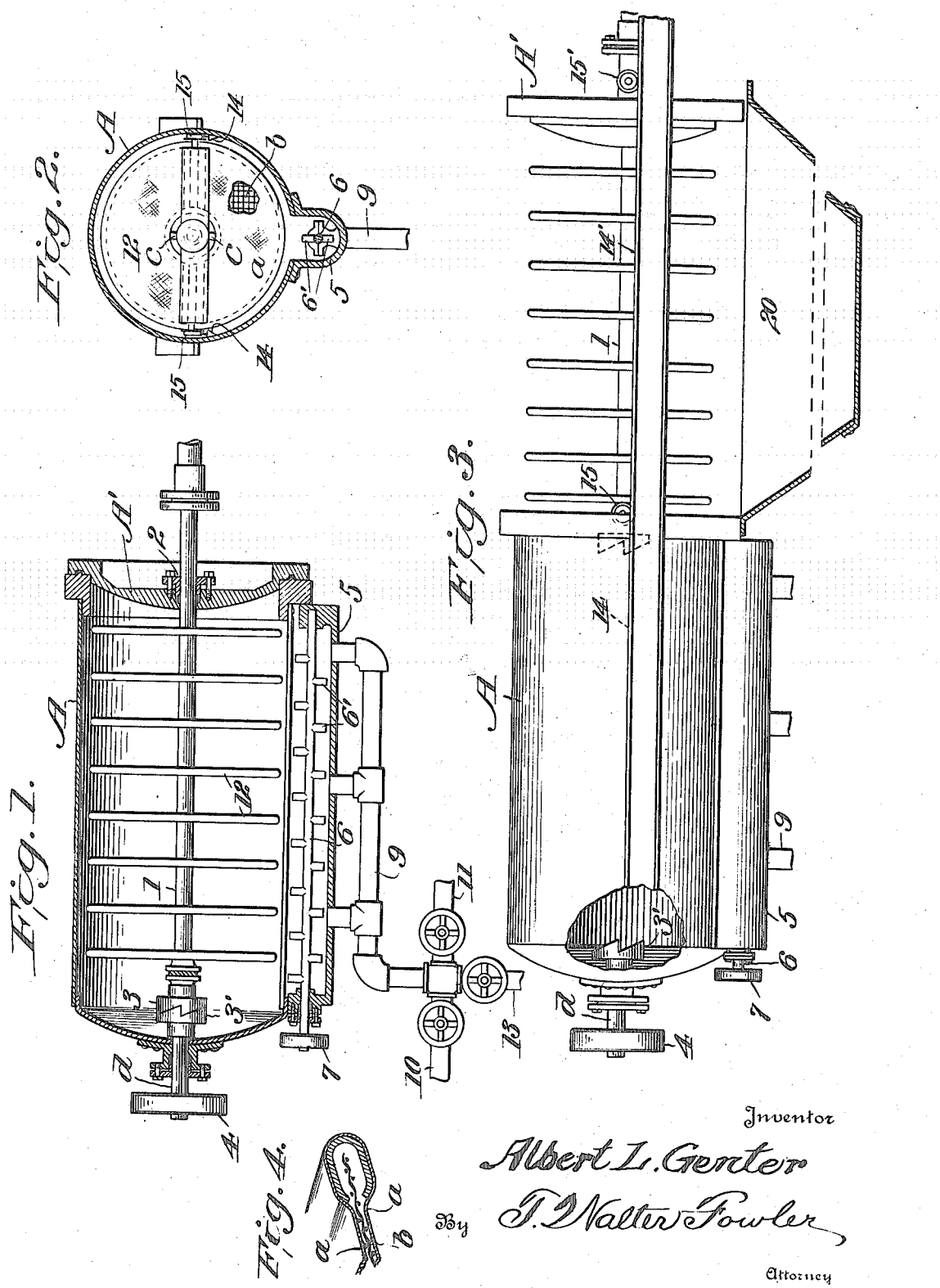

ALBERT LEGRAND GENTER, OF SALT LAKE CITY, UTAH, ASSIGNOR TO KELLY FILTER PRESS COMPANY, OF SALT LAKE CITY, UTAH, A CORPORATION OF UTAH.

FILTERING APPARATUS.

1,212,932.    Specification of Letters Patent.    Patented Jan. 16, 1917.

Application filed March 11, 1916, Serial No. 83,606. Renewed December 16, 1916. Serial No. 137,445.

*To all whom it may concern:*

Be it known that I, ALBERT L. GENTER, a citizen of the United States, residing at Salt Lake City, in the county of Salt Lake and State of Utah, have invented certain new and useful Improvements in Filtering Apparatus, of which the following is a specification.

My invention relates to certain new and useful improvements in filter presses or like apparatus designed to separate the liquid from the solid constituents of a solution; for instance, to separate slimes from which precious metals have been dissolved and the liquid which holds the precious metals in solution. The invention is also useful for filtering saccharine solutions, chemicals, and in fact, in any field of industry wherein the liquid portion of a solution is to be separated from the solids which it holds in suspension.

A leading object of the present invention is to provide a filter press with a removable, rotatably-mounted carrier in or on which filter leaves or frames are mounted and revoluble therewith, and means whereby the carrier is automatically connected to and disconnected from the power by which the carrier is rotated.

A further object is to provide filter presses substantially of the type referred to, with means for stirring or agitating the solution during the filtering function to thereby preserve the uniformity of the solution by maintaining the solids in a proper state of suspension, and to prevent these solids from settling on the bottom of the filter casing or shell.

With the above and other objects in view, my invention consists of the parts and the constructions, arrangements and combinations of parts which I will hereinafter describe and claim.

In the accompanying drawings forming part of this specification and in which similar reference characters indicate like parts in the several views; Figure 1 is a vertical longitudinal sectional view of a filter press embodying my invention. Fig. 2 is a cross-sectional view on the line 3—3 of Fig. 1. Fig. 3 is a side elevation showing the filter-leaf carrier removed from the interior of its inclosing shell or casing. Fig. 4 is a detail to be referred to.

In carrying out my invention I employ a shell or casing, A, of suitable dimensions and construction and having any desired form in cross-section. For present purposes the shell or casing is shown cylindrical, and upon the inner and outer sides thereof are suitable rails, 14, 14′, which form tracks or runways for the wheels, 15, 15′, at the inner and outer ends of the slidably mounted filter-leaf carrier which I will hereinafter more fully describe. The bottom of the shell or casing is formed with or has secured to it in any suitable manner, a trough, 5, which opens at its top into the bottom of the chamber of the shell or casing and extends substantially the length thereof, said trough having mounted within it a suitable agitator or stirrer which comprises a longitudinal shaft, 6, with vanes or blades, 6′, said shaft being journaled in the ends of the trough and having secured to one end a pulley, 7, or other agency by which the shaft may be rotated from any desired source of power.

Within the shell or casing, A, the filter carrier is slidably mounted. This carrier comprises a shaft, 1, which in the present instance, is shown hollow, and a head, A′, which has a stuffing box, 2, through which the shaft passes, said head serving as a tight closure for the open end of the tank and adapted in practice to be securely locked in place by some suitable head-locking mechanism. This mechanism is not shown as it forms no essential part of the present improvements, but such constructions as appear in the prior Kelly Patent Number 1,015,961, dated January 30, 1912, after which general type of machine the filter press herein shown is patterned, may be employed for securing the head, A′, of the carrier in its air-tight connection with the open end of the shell or casing. In the present case however, the filter-leaf carrier has a combined longitudinal and rotary motion, and the shaft, 1, is journaled for rotation in the head, A, and it serves as a conductor for the filtrate delivered from the several filter leaves.

The filter leaves or frames, 12, may be of any suitable construction. Ordinarily, each frame or leaf comprises fabric filtering sides, *a*, and an intermediate foraminous or woven wire backing or plate, *b*, as shown in Fig. 4, and in practice, the liquid constituent of the solution being filtered will be forced through the filtering sides to the interior of the leaf and from thence it is conducted by suitable connections, c, to the central hollow shaft, 1, for delivery outside of the press. The filter leaves or frames, in the present instance are shown circular to conform to the design of shell or casing employed, but other and different designs of leaves or frames and shell or casing may be employed without in any manner departing from the spirit of the present improvements. Neither the design or the specific construction of the filter leaves or the connection therewith of the central shaft are claimed broadly as a salient part of the present invention.

A leading feature of the present invention is providing the inner end of the central shaft, 1, with a member, 3, of a clutch adapted for operative engagement with a corresponding clutch member, 3', on a shaft, d, journaled in the permanent head of the shell or casing, A, said latter shaft being provided with a pulley, 4, or equivalent part to which power may be applied to rotate the shaft.

In operation, the solution to be filtered is pumped or otherwise delivered into the shell or casing when the filter leaf carrier is in position as shown in Fig. 1. The solution is admitted under pressure through a valve-controlled pipe, 11, into a manifold, 9, having branches which enter the bottom of the trough, 5, at a plurality of points to more uniformly distribute said material. This material is kept uniformly mixed by the agitator and when the tank is filled the filtering function begins and it continues with the filter leaves in rotation, until such time as the building up of the filter cakes on the outer sides of the filter leaves makes it necessary or desirable to cease this part of the operation. If the cakes are to be washed to recover any contained values, or for other purposes, the excess solution will be withdrawn through a drain-pipe, 13, or otherwise, and a suitable washwater, or other fluid, under pressure, is then admitted to the manifold, 9, and thence into the shell or casing by shutting off the solution supply, 11, and drain pipe, 13, and opening a valve in the wash-water supply pipe, 10, the pressure of which wash-water drives out of the filter cake and into the interior of the filter leaf any values retained in the cakes, and which values are discharged through the central hollow shaft, as before explained. After the cakes have been washed, the excess unfiltered material or wash water is displaced from the shell and the head, A', will be unlocked and the carrier slid endwise out of the shell or casing and over a tank or receptacle, 20, as shown in Fig. 3, to expose all of the filter leaves or frames and to make it possible to remove the filter cakes, (which may drop into the receptacle or tank, 20) by any well known method and to cleanse, renew or repair the leaves or frames. As the carrier moves out of the shell or casing, the clutch members, 3 and 3', separate, one relatively to the other, thereby disconnecting the carrier from the power, and when the carrier is slid back into the shell or casing for another cycle of operation, the clutch member, 3, on the shaft, 1, is automatically engaged with the companion driving clutch member, 3', and the power thus transmitted to rotate the shaft, 1, and the filter leaves carried thereby, at such speed as may be desired.

Having thus described my invention what I claim as new and desire to secure by Letters Patent is:—

1. In a filtering apparatus of the character described, the combination with a shell or casing and a carrier slidably mounted relatively thereto, and provided with filter leaves and a central hollow shaft which communicates with the interior of said leaves, of a driving shaft mounted in one end of the shell, and engageable clutch members between said driving shaft and the inner end of said hollow shaft.

2. In a filtering apparatus of the character described, the combination with a shell or casing and a carrier slidably mounted relatively thereto, and provided with filter leaves and a central hollow shaft which communicates with the interior of said leaves, of a driving shaft entering one end of the shell or casing, and clutch members on the opposed ends of said shafts adapted to operatively engage substantially simultaneously with the seating of the carrier within the shell or casing.

3. In a filtering apparatus of the character described, the combination with a shell or casing and a carrier slidably mounted relatively thereto, and provided with filter leaves and a central hollow shaft which communicates with the interior of said leaves, of a driving shaft entering one end of the shell or casing, and clutch members on the opposed ends of said shafts adapted to operatively engage substantially simultaneously with the seating of the carrier within the shell or casing, and to disengage by and in unison with the outward movement of the carrier relatively to said shell or casing.

4. In a filtering apparatus of the character described, the combination with a shell or casing and a carrier slidably mounted relatively thereto, and provided with filter leaves, of a pair of alined shafts, one of said shafts being a drive shaft and the other a driven shaft said driven shaft being hollow and provided with filtering agents, and coacting clutch members fixed to the opposed ends of the shafts and engageable and disengageable by and in unison with the sliding movement of the carrier.

5. In filtering apparatus of the character described, a solution-containing shell or casing having a trough extending along its bottom and opening at the top into the bottom of the shell, a solution-supply pipe connecting with said trough, an agitator mounted in the trough and adapted to maintain the solid constituents of the solution in suspension, and filtering agencies mounted in the shell or casing.

6. In filtering apparatus of the character described, a solution-containing shell or casing having a trough extending along its bottom and opening at the top into the bottom of the shell, a solution-supply pipe connecting with said trough, an agitator mounted in the trough and adapted to maintain the solid constituents of the solution in suspension, filtering agencies mounted in the shell or casing, and means for rotating said agencies in the solution during the filtering operation.

In testimony whereof I affix my signature.

ALBERT LEGRAND GENTER.